(12) United States Patent
Yamaguchi et al.

(10) Patent No.: US 7,957,595 B2
(45) Date of Patent: Jun. 7, 2011

(54) DATABASE MANAGEMENT PROGRAM, DATABASE MANAGEMENT APPARATUS AND DATABASE MANAGEMENT METHOD

(75) Inventors: Masayoshi Yamaguchi, Kawasaki (JP); Terutoshi Taguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 956 days.

(21) Appl. No.: 11/892,650

(22) Filed: Aug. 24, 2007

(65) Prior Publication Data
US 2008/0056581 A1 Mar. 6, 2008

(30) Foreign Application Priority Data
Aug. 31, 2006 (JP) .................... 2006-235659

(51) Int. Cl.
*G06K 9/46* (2006.01)
*G06K 9/00* (2006.01)

(52) U.S. Cl. ............... 382/203; 382/181; 707/E17.023; 707/E17.024

(58) Field of Classification Search .................. 382/300, 382/203, 181, 197, 199, 218, 224
See application file for complete search history.

(56) References Cited

U.S. PATENT DOCUMENTS

| | | | | |
|---|---|---|---|---|
| 5,870,106 | A * | 2/1999 | Langelaan | 345/441 |
| 6,751,343 | B1 * | 6/2004 | Ferrell et al. | 382/145 |
| 6,983,440 | B1 * | 1/2006 | Nequist | 716/139 |
| 7,421,125 | B1 * | 9/2008 | Rees | 382/181 |
| 2002/0086347 | A1 * | 7/2002 | Johnson et al. | 435/40.5 |
| 2003/0052875 | A1 * | 3/2003 | Salomie | 345/419 |
| 2003/0163791 | A1 * | 8/2003 | Falbo et al. | 716/2 |
| 2003/0195883 | A1 * | 10/2003 | Mojsilovic et al. | 707/6 |
| 2003/0204823 | A1 * | 10/2003 | Armstrong et al. | 716/2 |
| 2005/0188309 | A1 * | 8/2005 | Tasker et al. | 715/700 |

FOREIGN PATENT DOCUMENTS
JP 9-179892 7/1997

OTHER PUBLICATIONS

Machine Translation for IDS document: JP 09-179892 A.*
http://www.mutoh.co.jp/it/products/3dsearchit/index.htm; Jul. 29, 2002.
http://www.research.ibm.com/trl/projects/3dweb/SimSearch_e.htm; Sep. 30, 1999.

(Continued)

*Primary Examiner* — Vikkram Bali
*Assistant Examiner* — Michelle Entezari
(74) *Attorney, Agent, or Firm* — Staas & Halsey LLP

(57) ABSTRACT

A database management program, a database management apparatus and a database management method can determine the sameness of shape data at high speed. The program causes a computer to execute a first edge line acquisition step that acquires the edge lines of the first shape data, an information registration step that generates information showing the characteristics of the edge lines acquired by the first edge line acquisition step as first edge line characteristic information, associates the first edge line characteristic information with the first shape data and registers them in a database, a second edge line acquisition step that acquires the edge lines of the second shape data showing the requirements of retrieval, an information generation step that generates edge line characteristic information of the edge lines acquired by the second edge line acquisition step as second edge line characteristic information and a retrieval step that retrieves the third shape data that is the part of the first shape data that agrees with the second shape data according to the first edge line characteristic information and the second edge line characteristic information.

20 Claims, 17 Drawing Sheets

OTHER PUBLICATIONS

Japanese Patent Laid-Open No. 9-179892, Jul. 11, 1997.
*3D geometry search technology*, http://www.research.ibm.com/trl/projects/3dweb/SimSearch_e.htm, Sep. 30, 1999.

*3D SearchIT*, http://www.mutoh.co.jp/it/products/3dsearchit/index.htm, Jul. 29, 2002.

* cited by examiner

FIG.2

| EDGE LINE TYPE | CHARACTERISTIC LINE TYPE |
|---|---|
| STRAIGHT LINE | STRAIGHT LINE |
| CIRCLE | CIRCLE |
| CIRCULAR ARC | CIRCULAR ARC |
| ELLIPTIC ARC<br>OPEN SPLINE | CURVED LINE 1<br>(SPLINE WITH STARTING POINT DIFFERENT FROM TERMINAL POINT) |
| ELLIPTIC ARC<br>CLOSED SPLINE | CURVED LINE 2<br>(SPLINE WITH STARTING POINT SAME AS TERMINAL POINT) |

FIG.3
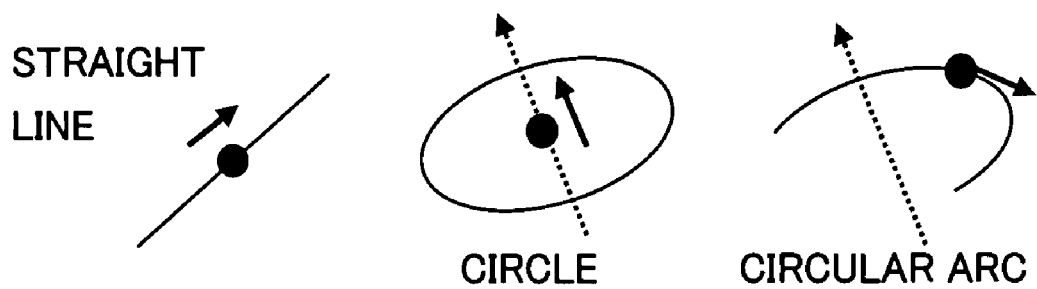
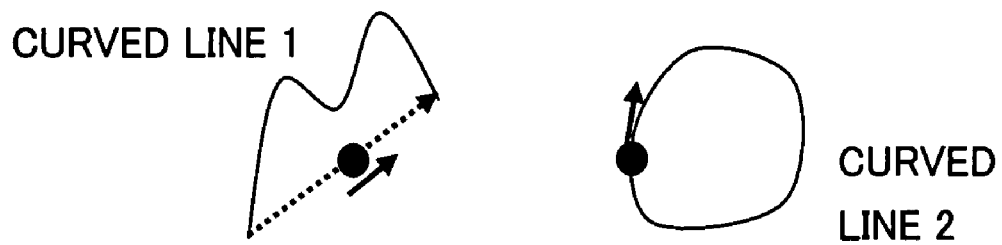
| ●:REPRESENTATIVE COORDINATES | ↗:REPRESENTATIVE VECTOR |

FIG.4

| CHARACTERISTIC LINE TYPE (CHARACTERISTIC LINE TYPE ID) | CHARACTERISTIC LINE LENGTH | REPRESENTATIVE COORDINATES | REPRESENTATIVE VECTOR |
|---|---|---|---|
| STRAIGHT LINE (1) | EDGE LINE LENGTH | MIDDLE POINT BETWEEN STARTING POINT AND TERMINAL POINT | VECTOR FROM STARTING POINT TO TERMINAL POINT |
| CIRCLE (2) | RADIUS | CENTER | VECTOR OF CENTRAL AXIS |
| CIRCULAR ARC (3) | EDGE LINE LENGTH | BISECTIONAL POINT OF CIRCULAR ARC | TANGENTIAL VECTOR AT REPRESENTATIVE COORDINATES |
| CURVED LINE 1 (4) | DISTANCE OF STRAIGHT LINE SEGMENT CONNECTING STARTING POINT AND TERMINAL POINT | MIDDLE POINT BETWEEN STARTING POINT AND TERMINAL POINT | VECTOR FROM STARTING POINT TO TERMINAL POINT |
| CURVED LINE 2 (5) | EDGE LINE LENGTH | STARTING POINT | TANGENTIAL VECTOR AT REPRESENTATIVE COORDINATES |

FIG.14
RETRIEVAL KEY
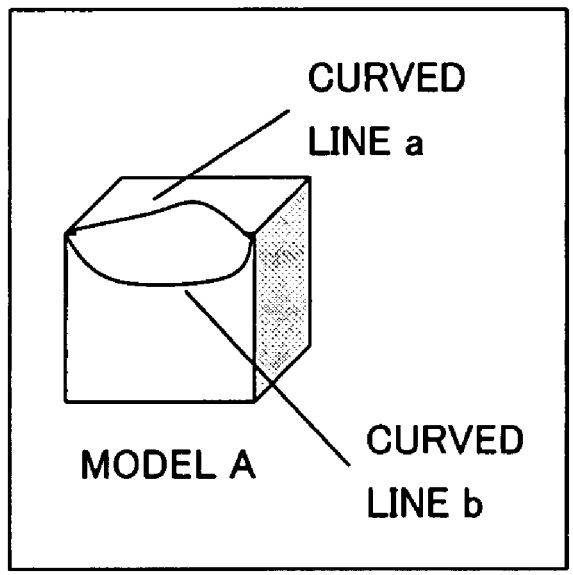
EDGE LINE CHARACTERISTIC INFORMATION DB
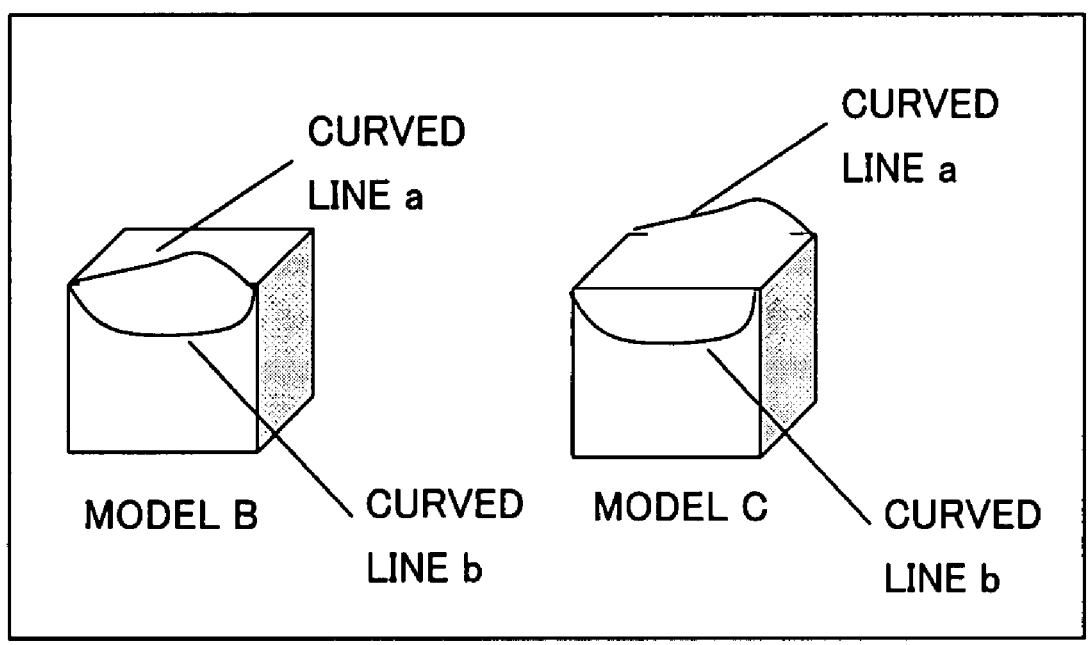

| DESIGN MODEL | NUMBER OF PARTS | STRAIGHT LINE | CIRCULAR ARC | CIRCLE | CURVED LINE | TOTAL | NUMBER OF MODELS |
|---|---|---|---|---|---|---|---|
| 1 DATA A | 44 | 15,488 | 5,789 | 0 | 8,442 | 29,719 | 1 |
| 2 DATA B | 44 | 15,488 | 5,789 | 0 | 8,442 | 29,719 | 9 |
| 3 DATA C | 32 | 18,800 | 4,458 | 0 | 4,316 | 27,574 | 330 |
| 4 DATA D | 63 | 12,284 | 4,660 | 0 | 236 | 17,180 | 330 |
| 5 DATA E | 108 | 13,862 | 5,870 | 0 | 1,353 | 21,085 | 330 |

DATABASE MANAGEMENT PROGRAM, DATABASE MANAGEMENT APPARATUS AND DATABASE MANAGEMENT METHOD

BACKGROUND OF THE INVENTION

1. Field of the Invention

The present invention relates to a database management program, a database management apparatus and a database management method for managing a database for profile data.

2. Description of the Related Art

Product development in the manufacturing industries does not necessarily mean design activities involving new preparations of elements of three-dimensional shape models and two-dimensional drawings. All or part of the data of existing three-dimensional shape models and two-dimensional drawings are more often than not copied and reused to shorten the work period and reduce the cost. For this reason, the elements of the three-dimensional shape models and the two-dimensional drawings that are utilized frequently are stored in a DB (database) that is referred to as "model L (library) DB (database) as unit models (including standard models and common models) to be reutilized. With such an arrangement, the designer can design a new product by exploiting the existing assets, taking out data from the model LDB for use whenever necessary.

In the operation of exploiting the existing assets, it can be time consuming to retrieve the model that the designer wants from such an LDB, or a database storing existing models. Reduction of the time to be spent for retrieving the model that the designer wants results in reduction of the entire product design period and cost down for the development of the new product. Such an LDB may be exploited not only when the designer retrieves the model he or she wants for designing a new profile. When one of the existing models is altered, the models that relate to the altered model may have to be retrieved and, if necessary, modified. The models that relate to the altered model may include those that are entirely or partly being exploited by the designer. Additionally, if any of the models in the product that is shipped and marketed is found to be in need of improvement, it may be necessary not only to modify the model but also to retrieve all the products produced by utilizing the model and replace it with a faultless model. Thus, there are many scenes where one or more than one models and/or one or more than one profiles need to be retrieved in any of the processes in the life cycle of a product, including the stages of preparation, design, manufacturing, shipment and disposal. Therefore, there is a strong demand for techniques that allow a quicker access to necessary data by reducing both the time for retrieving data and the time for collecting pieces of information.

Now, known techniques for retrieving a model will be discussed below. Such techniques include firstly "character string retrieval techniques" that give meaningful titles to the models and the drawings that may be exploited in the future and store the models and the drawings in advance so that necessary data may be retrieved by means of a command on a CAD (Computer Aided Design) system or a data management system, using a character string found in some of the titles of the models and the drawings as retrieval key. However, many CAD systems are so designed that necessary data can be retrieved not by using a character string but by using as retrieval key a piece of attribute information that a model or a drawing has, which may be color information on the color put to an element of the model or the drawing such as "red" or "blue" or material information such as "iron" or "aluminum". As for two-dimensional drawings, there are CAD systems where the drawing that a designer needs can be retrieved by using as retrieval key the type and the number of elements contained in the drawing such as line segments or circles. There are various pieces of information that characterize three-dimensional models including the numbers of components such as colors, shapes, volumes, areas, surfaces and edge lines, shape lines, moments of inertia and aspect ratios. Thus, there are CAD systems where the model that a designer needs can be retrieved by using as retrieval key one or more than one of such characteristics.

Researches are being made in various technical fields for "shape matching" of detecting a model having a profile that resembles the shape of the model of a retrieval key not by using a characteristic string or a piece of attribute information but by using a whole three-dimensional shape. Processing techniques that processes images for "matching" have also been devised. For example, known such techniques include those that convert a two-dimensional drawing into image data in order to judge the similarity of shape according to the degree of similarity of parts where lines are involved and those that convert the state of a three-dimensional image being displayed on a display screen into image data and evaluate the degree of undulations produced due to the degrees of luminance of contour profiles and surfaces in order to judge the similarity of shapes.

In the current situation where three-dimensional CAD system have become popular and taken a major role to replace two-dimensional CAD systems, it is indispensable to retrieve a three-dimensional model that agrees with the profile that the designer wants from the viewpoint of marketing the product early and reducing the product development cost for the purpose of achieving a high turnover. Therefore, there is a strong demand for functions and tools for such retrieval operations. As a matter of fact, similar shapes retrieval engines for retrieving three-dimensional CAD data have been provided (see, for example, Non-Patent Document 1: Mutoh Industries, Ltd., "3DSearchIT", URL=http://www.mutoh.co.jp/it/products/3dsearchit/index.htm, Jul. 29, 2002, Non-Patent Document 2: IBM Japan IBM, Ltd., Tokyo Research Laboratory, "Three-Dimensional Shape Similarity Retrieval Technology", URL=http://www.research.ibm.com/trl/projects/3dweb/SimSearch.htm, Sep. 30, 1999.

The conventional art that relates to the present invention includes design support apparatus that can present combinations of exemplary parts and standard parts necessary for designs for realizing required specifications and facilitate the operation of building a standard part database (see, for example, Patent Document 1: Jpn. Pat. Appln. Laid-Open Publication No. 9-179892).

While similar shapes retrieval engines designed so as to be incorporated in CAD systems are known as pointed out above, they are simply tools for retrieving similar shapes. However, in actual design scenes where a CAD system is being exploited, designers have mostly specific numerical values such as those of lengths and angles in mind. For example, a designer may wants a model that snugly satisfies certain requirements as expressed by "a product model having three 10 mm holes". Then, it is necessary not only to retrieve similar profiles but also to narrow down the candidate models to a model or models that meet the requirements.

Furthermore, when models are retrieved by means of attribute information such as color information and contour line information, they are downloaded from a DB and attribute information on a shape is taken out from a memory and compared with a retrieval key. Then, the retrieval process will be very time consuming because it involves not only the proper model retrieving operation but also the process time necessary for loading the retrieved models in the system and releasing the memory.

SUMMARY OF THE INVENTION

In view of the above-identified problems, it is therefore an object of the present invention to provide a database management program, a database management apparatus and a database management method for determining the sameness of shape data at high speed.

In an aspect of the present invention, the above object is achieved by providing a database management program for causing a computer to manage a database for shape data, the program comprising: a first edge line acquisition step that acquires an edge line from at least single first shape data that is shape data of a shape designed in advance and includes the edge line; an information registration step that generates edge line characteristic information that is information showing the characteristics of the edge line according to the edge line acquired in the first edge line acquisition step, defines the edge line characteristic information as first edge line characteristic information, associates the first edge line characteristic information with the first shape data and registers it in the database; a second edge line acquisition step that acquires an edge line from second shape data that is shape data representing a retrieval requirement and includes the edge line; an information generation step that generates edge line characteristic information according to the edge line acquired in the second edge line acquisition step and defines the edge line characteristic information as second edge line characteristic information; and a retrieval step that retrieves third shape data that agrees with the second shape data out of the first shape data according to the first edge line characteristic information registered in the information registration step and the second edge line characteristic information generated in the information generation step.

Preferably, in a database management program according to the present invention as defined above, the edge line characteristic information include edge line shape information showing the shape of the edge line and edge line position information showing the positional relationship between the edge line and the other edge line or edge lines included in the shape data.

Preferably, in a database management program according to the present invention as defined above, the edge line shape information includes type information showing the type of the edge line and size information showing the size of the edge line.

Preferably, in a database management program according to the present invention as defined above, the edge line position information includes the representative coordinates that are the coordinates showing the position of the edge line in the shape data to which the edge line belongs and the representative vector that is the vector showing the direction of the edge line in the shape data to which the edge line belongs.

Preferably, in a database management program according to the present invention as defined above, the retrieval step defines the first shape data whose edge line shape information agrees with the edge line shape information of the second shape data as candidate shape data out of the first shape data, if there are more than one first shape data according to the edge line shape information of the first shape data and the edge line shape information of the second shape data, and selects candidate shape data showing a positional relationship of the edge lines thereof agreeing with the positional relationship of the edge lines of the second shape data as third shape data out of the candidate shape data, if there are more than one candidate shape data according to the edge line position information of the candidate shape data and the edge line position information of the second shape data.

Preferably, in a database management program according to the present invention as defined above, the retrieval step selects combinations of the edge lines of the second shape data, computationally determines the positional relationship of the combinations from the edge line position information corresponding to the combinations, selects combinations of the edge lines of the candidate shape data, computationally determines the positional relationship of the combinations from the edge line position information corresponding to the combinations and defines the candidate shape data as third shape data when the positional relationship of all the combinations obtained from the second shape data and the positional relationship of all the combinations obtained from the candidate shape data agree with each other.

Preferably, in a database management program according to the present invention as defined above, the size information is the length of the edge line, the radius of the edge line or the distance of the straight line from the starting point to the terminal point of the edge line and the representative coordinates show the bisectional point of the edge line, the center of the edge line or the bisectional point of the straight line from the starting point to the terminal point of the edge line, while the representative vector shows the direction from the starting point to the terminal point of the edge line, the direction of the central axis of the edge line or the direction of the tangential line at the representative coordinates.

Preferably, in a database management program according to the present invention as defined above, the type information shows either a first curved line that is a straight line, a circle, a circular arc or an open curved line other than a circular arc or a second curved line that is a closed curved line other than a circle.

Preferably, in a database management program according to the present invention as defined above, the size information is the length of the edge line and the representative coordinates show the bisectional point of the edge line, while the representative vector shows the direction from the starting point to the terminal point of the edge line when the type information of the edge line indicates a straight line.

Preferably, in a database management program according to the present invention as defined above, the size information is the radius of the edge line and the representative coordinates show the center of the edge line, while the representative vector shows the direction of the central axis of the edge line when the type information of the edge line indicates a circle.

Preferably, in a database management program according to the present invention as defined above, the size information is the length of the edge line and the representative coordinates show the bisectional point of the edge line, while the representative vector shows the tangential line at the representative coordinates when the type information of the edge line indicates a circular arc.

Preferably, in a database management program according to the present invention as defined above, the size information is the distance of the straight line from the starting point to the terminal point of the edge line and the representative coordinates show the bisectional point of the edge line between the starting point and the terminal point thereof, while the representative vector shows the direction from the starting point to the terminal point of the edge line when the type information of the edge line indicates a first curved line.

Preferably, in a database management program according to the present invention as defined above, the size information is the length of the edge line and the representative coordinates show the starting point of the edge line, while the representative vector shows the direction of the tangential line of the edge line when the type information of the edge line indicates a second curved line.

Preferably, in a database management program according to the present invention as defined above, the information registration step sorts the edge line shape information from the type with the lowest frequency of utilization according to the type information.

Preferably, in a database management program according to the present invention as defined above, the information registration step sorts the edge line shape information according to the size information.

In another aspect of the present invention, there is provided a database management apparatus for managing a database for shape data, the apparatus comprising: a first edge line acquisition section that acquires an edge line from at least single first shape data that is shape data of a shape designed in advance and includes the edge line; an information registration section that generates edge line characteristic information that is information showing the characteristics of the edge line according to the edge line acquired by the first edge line acquisition section, defines the edge line characteristic information as first edge line characteristic information, associates the first edge line characteristic information with the first shape data and registers it in the database; a second edge line acquisition section that acquires an edge line from second shape data that is shape data representing a retrieval requirement and includes the edge line; an information generation section that generates edge line characteristic information according to the edge line acquired by the second edge line acquisition section and defines the edge line characteristic information as second edge line characteristic information; and a retrieval section that retrieves third shape data that agrees with the second shape data out of the first shape data according to the first edge line characteristic information registered by the information registration section and the second edge line characteristic information generated by the information generation section.

Preferably, in a database management apparatus according to the present invention as defined above, the edge line characteristic information include edge line shape information showing the shape of the edge line and edge line position information showing the positional relationship between the edge line and the other edge line or edge lines included in the shape data.

Preferably, in a database management apparatus according to the present invention as defined above, the retrieval section defines the first shape data whose edge line shape information agrees with the edge line shape information of the second shape data as candidate shape data out of the first shape data, if there are more than one first shape data according to the edge line shape information of the first shape data and the edge line shape information of the second shape data, and selects candidate shape data showing a positional relationship of the edge lines thereof agreeing with the positional relationship of the edge lines of the second shape data as third shape data out of the candidate shape data, if there are more than one candidate shape data, according to the edge line position information of the candidate shape data and the edge line position information of the second shape data.

Preferably, in a database management apparatus according to the present invention as defined above, the retrieval section selects combinations of the edge lines of the second shape data, computationally determines the positional relationship of the combinations from the edge line position information corresponding to the combinations, selects combinations of the edge lines of the candidate shape data, computationally determines the positional relationship of the combinations from the edge line position information corresponding to the combinations and defines the candidate shape data as third shape data when the positional relationship of all the combinations obtained from the second shape data and the positional relationship of all the combinations obtained from the candidate shape data agree with each other.

In still another aspect of the present invention, there is provided a database management method for managing a database for shape data, the method comprising: a first edge line acquisition step that acquires an edge line from at least single first shape data that is shape data of a shape designed in advance and includes the edge line; an information registration step that generates edge line characteristic information that is information showing the characteristics of the edge line according to the edge line acquired in the first edge line acquisition step, defines the edge line characteristic information as first edge line characteristic information, associates the first edge line characteristic information with the first shape data and registers it in the database; a second edge line acquisition step that acquires an edge line from second shape data that is shape data representing a retrieval requirement and includes the edge line; an information generation step that generates edge line characteristic information according to the edge line acquired in the second edge line acquisition step and defines the edge line characteristic information as second edge line characteristic information; and a retrieval step that retrieves third shape data that agrees with the second shape data out of the first shape data according to the first edge line characteristic information registered in the information registration step and the second edge line characteristic information generated in the information generation step.

Thus, according to the present invention, it is possible to determine the sameness of shape data at high speed.

BRIEF DESCRIPTION OF THE DRAWINGS

FIG. 2 is a schematic illustration of the correspondence of the edge line types and the characteristic line types of the embodiment of FIG. 1;

FIG. 3 is a schematic conceptual illustration of the characteristic line types of the embodiment of FIG. 1;

FIG. 4 is a schematic illustration of the contents of the edge line characteristic information of the embodiment of FIG. 1;

FIG. 14 is a schematic illustration of models of the embodiment of FIG. 1;

DETAILED DESCRIPTION OF THE PREFERRED EMBODIMENTS

Now, the present invention will be described in greater detail by referring to the accompanying drawings that illustrate a preferred embodiment of the invention.

The present invention will be described below in terms of a CAD apparatus realized by applying an embodiment of database management apparatus according to the invention.

Firstly, the configuration of the CAD apparatus realized by applying an embodiment of the present invention will be described.

Figure 1:
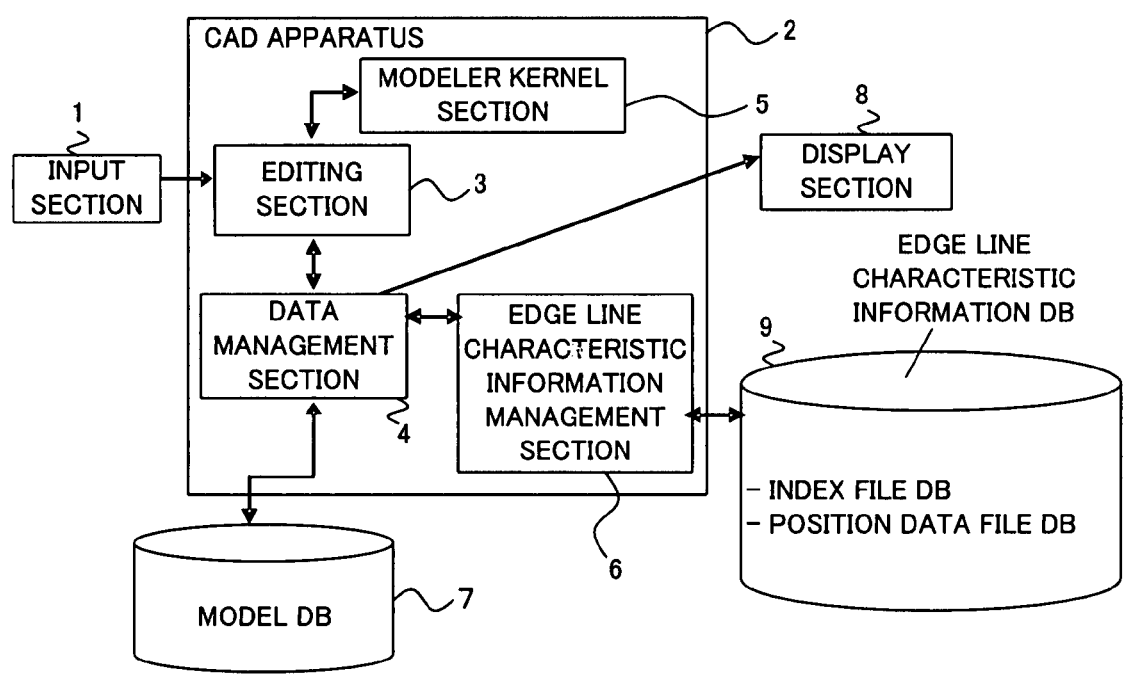
FIG. 1 is a schematic block diagram of a CAD apparatus realized by applying an embodiment of the present invention, showing the configuration thereof.

FIG. 1 is a schematic block diagram of a CAD apparatus realized by applying an embodiment of the present invention, showing the configuration thereof. Referring to FIG. 1, the CAD apparatus 2 is connected to an input section 1, a model DB 7, a display section 8 and an edge line characteristic information DB 9. The CAD apparatus 2 comprises an editing section 3, a data management section 4, a modeler kernel section 5 and an edge line characteristic information management section 6. Note that all the editing section 3, the data management section 4, the modeler kernel section 5 and the edge line characteristic information management section 6 are realized as programs to be executed by the CPU of the CAD apparatus 2.

The input section 1 is an input interface such as a keyboard and/or mouse. The model DB is a database that stores the models (shape data) prepared by the CAD apparatus 2. The display section 8 may be a monitor screen for displaying any of the data and the shapes prepared by the CAD apparatus 2. The edge line characteristic information DB 9 is a database that stores information necessary for retrieving one or more than one models at high speed. More specifically, it stores the edge line characteristic information prepared according to the edge lines in the model DB 7.

Now, the operation of the CAD apparatus 2 for preparing a model will be described below.

Firstly, as the user of the CAD apparatus 2 inputs directives for preparing a model including the cross sectional shapes and the dimensional values of the model, the editing section 3 requests the modeler kernel section 5 to prepare a three-dimensional shape model according to the directives from the input section 1. Then, the modeler kernel section 5 generates design data of the three-dimensional shape model and display data for displaying the model according to given cross-sectional shapes and dimensional value S and sends back the outcome to the editing section 3. Thereafter, the editing section 3 hands over the design data and the display data obtained from the modeler kernel section 5 to the data management section 4. The data management section 4 assigns management IDs to the surfaces, the edge lines and the apexes in the design data and stores them in the model DB 7 as design file of the model. The display data is displayed on the display section 8.

Now, edge line characteristic information will be described below.

From the view point of the data structure, three-dimensional models of CAD are divided into three types including wire frame models, surface models and solid models. However, the shape of a model can be expressed by a single array of edge lines or a plurality of arrays of edge lines if it is not necessary to determine the volume and the surface area of the model. In this embodiment, the edge lines of the model DB 7 are transformed into edge line characteristic information in the edge line characteristic information DB 9. Edge line characteristic information has four categories of information that include characteristic line types (type information), characteristic lengths expressing the magnitudes of characteristic lines (size information), representative coordinates expressing the positions of characteristic lines and representative vectors that are normal line vectors or tangential line vectors expressing the directions of characteristic lines.

If the model DB 7 is of the general type, all edge lines in the model DB 7 are classified into seven edge line types including straight lines, circles, circular arcs, elliptic arcs, ellipses, closed splines (free curved lines having a starting point and a terminal point located by the same coordinates) and open splines (open free curved lines). In this embodiment, however, all edge lines are converted into characteristic lines and classified into five characteristic line types including straight lines, circles, circular lines, curved lines 1 (first curved lines) and curved lines 2 (second curved lines). FIG. 2 is a schematic illustration of the correspondence of the edge line types and the characteristic line types of this embodiment. In the table of FIG. 2, the first column shows the edge line types and the second column shows the characteristic line types of this embodiment that correspond to the edge line types. Straight lines, circles and circular arcs of the edge line types respectively correspond to straight lines, circles and circular arcs of the characteristic line types of this embodiment, whereas elliptic arcs and open splines of the edge line types are put together as curved lines having a starting point and a terminal point located by different coordinates so as to correspond to curved lines 1 of the characteristic line types of this embodiment and ellipses and closed splines are put together as curved lines having a starting point and a terminal point located by the same coordinates so as correspond to curved lines 2 of the characteristic line types of this embodiment.

FIG. 3 is a schematic conceptual illustration of the characteristic line types of this embodiment. FIG. 4 is a schematic illustration of the table showing the contents of the edge line characteristic information of this embodiment. Referring to FIG. 4, the table shows the characteristic line type (characteristic line type ID), the characteristic line length, the representative coordinates and the representative vector for each characteristic line type. When the characteristic line type is curved lines 1 or curved lines 2, information on the control point or points and the transit point or points contained in the corresponding edge line is omitted. In other words, the data structure of the edge line characteristic information is simple relative to the edge lines so that the quantity of data to be compared at the time of data retrieval is reduced.

For the characteristic line types of straight lines, circles, circular arcs and curves 2, the edge line length of the corresponding edge line is computationally determined and defined as characteristic line length. For the characteristic line type of curved lines 1, the distance of the straight line from the starting point and the terminal point of the corresponding edge line is computationally determined and defined as characteristic line length.

For the characteristic line type of circles, the center coordinates of the corresponding edge line are defined as representative coordinates. For the characteristic line type of curved lines 2, the coordinates of the starting point of the corresponding edge line are defined as representative coordinates. For the characteristic line types of straight lines and curved lines 1, the coordinates of the middle point of the line segment connecting the starting point and the terminal point of the corresponding edge line is computationally determined and defined as representative coordinates. For the characteristic line type of circular arcs, the coordinates of the point on the corresponding edge line that bisects the edge line is computationally determined and defined as representative coordinates.

For the characteristic line types of straight lines and curved lines 1, the unit vector (tangential line vector) indicating the direction from the starting point to the terminal point of the corresponding edge line is computationally determined and defined as representative vector. For the characteristic line types of circles and circular arcs, the unit vector indicating the central axis of the corresponding edge line (the normal line vector of the corresponding edge line) is computationally determined and defined as representative vector. Finally, for the characteristic line type of curved lines 2, the tangential line vector at the starting point of the corresponding edge line is computationally determined and defined as representative vector.

Now, the edge line characteristic information DB 9 will be described below.

Figure 5:
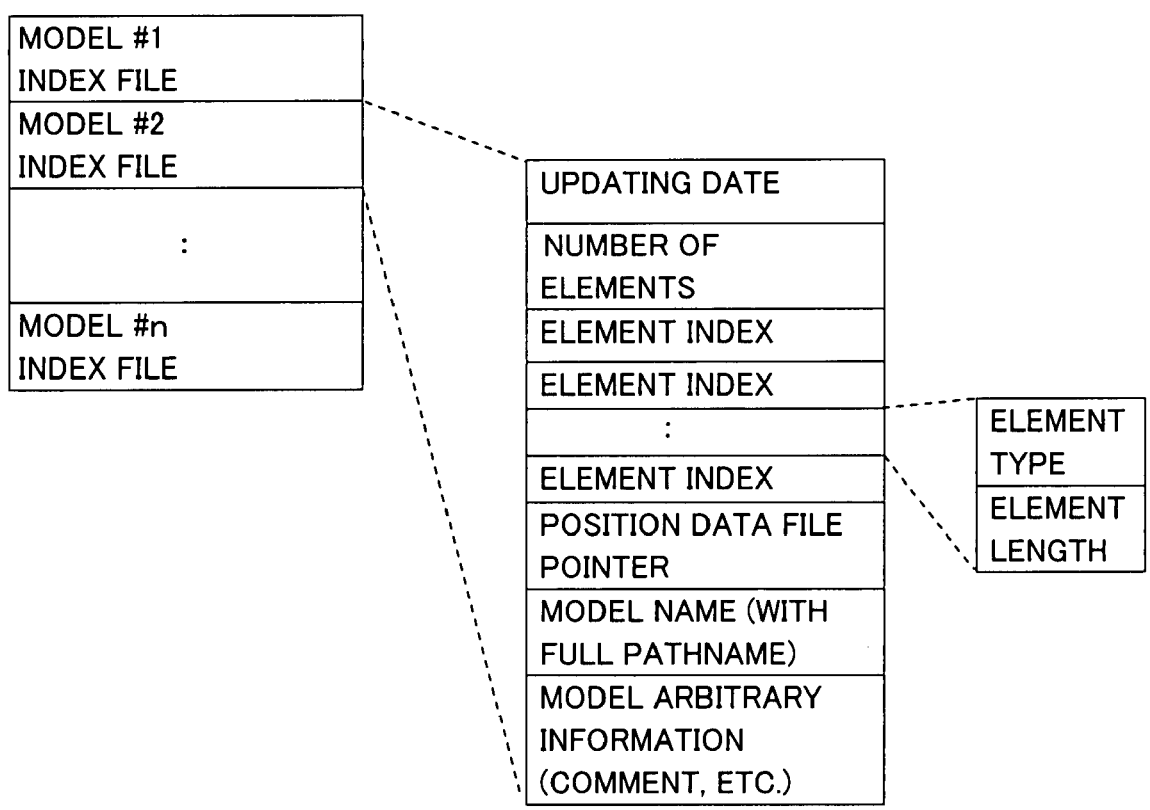
FIG. 5 is a schematic illustration of the data structure of the index file DB (database) of the embodiment of FIG. 1.

The edge line characteristic information DB 9 is constituted by an index file DB and a position data file DB. FIG. 5 is a schematic illustration of the data structure of the index file DB (database) of the embodiment of FIG. 1. Referring to FIG. 5, index files of respective models are stored in the index file DB. The index files are sorted sequentially from the file having the youngest date on the assumption that the models having the youngest update dates will be accessed most frequently by designers. With this arrangement, models can be retrieved at high speed. If a model retrieving operation has to be suspended on the way for some reason or another, it may be detected highly probably if it is a model accessed by designers very frequently in the past because of the order of arrangement of index files.

The index file of each model stores the updated dates of the model, the number of the elements (edge lines) of the model, the element indexes provided for the respective elements to summarily show the elements, the position data file pointer that indicates the leading address of the position data file of the corresponding model in the position data file DB, the model name of the corresponding model in the model DB 7 including the full pathname of the model and arbitrarily selected and annexed pieces of information on the model such as comments. The element index stores the characteristic line type ID and the characteristic line length out of the edge line characteristic information of the element and takes a numeral selected from 1, 2, 3, 4 and 5, which correspond respectively to a straight line, a circle, a circular arc, a curved line 1 and a curved line 2.

In a real index file, the characteristic line type ID is stored as an integer of three (3) bits without showing any sign. The characteristic line length (a real number of eight (8) bits× 1000.0–1.0) is converted into an integer carrying no sign and stored. Then, the characteristic line length can take a value within a range from 1 μm to about 536 m. The range of value may alternatively be defined to be from 0.1 μm to about 53 m.

The element indexes contained in an index file are sorted in the ascending order of the frequencies of appearance of the characteristic line types (in the order of curved line 2, curved line 1, circular arc, circle and straight line) of the elements in really designed objects. In other words, they are sorted in the descending order of the sizes of the characteristic line type IDs. When there are more than one elements having a same characteristic line type ID, the element indexes are sorted in the descending order of the characteristic line lengths. However, when there are more than one elements having a same characteristic line type ID, the element indexes may alternatively be sorted in the ascending order of the characteristic line lengths. A quick-sort technique is employed to rearrange data.

Figure 6:
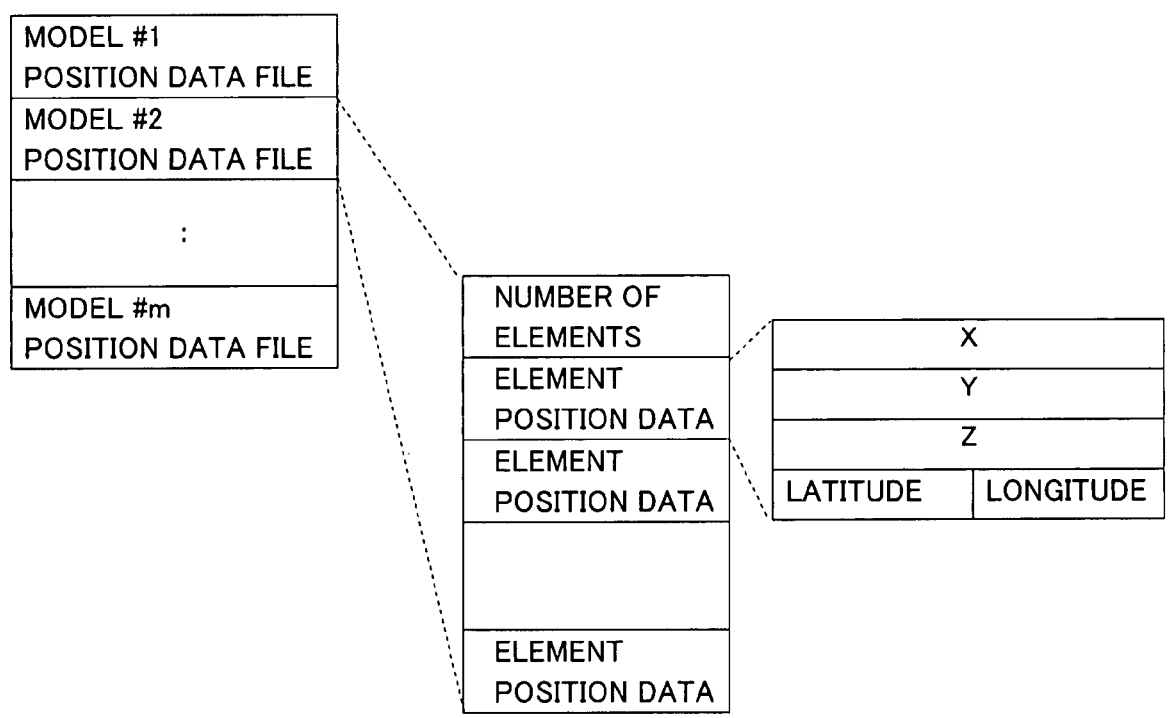
FIG. 6 is schematic illustration of the data structure of the position data file DB (database) of the embodiment of FIG. 1.

FIG. 6 is schematic illustration of the data structure of the position data file DB (database) of this embodiment. Referring to FIG. 6, the position data file DB stores the position data files of the respective models. A position data file stores the number of elements and the element position data of the respective elements. Element position data stores the representative coordinates (X, Y, Z) and the representative vector (Nx, Ny, Nz) out of the edge line characteristic information of the element. A representative vector is subjected to a conversion process of converting from latitude to longitude (θ, ø) and stored.

$$\theta = a\cos(Nz)$$

$$\emptyset = a\tan 2(Ny, Nx)$$

In a real position data file, the representative coordinates (X, Y, Z) are stored respectively as real numbers of four (4) bits. Each of the elements of the representative vector (θ, ø) is subjected to a conversion process of converting from a real number within a range from 0 to $2\pi$ [rad] to an integer of sixteen (16) bits without showing any sign and within a range from 0 to $2^{16}$ and stored.

Like an element index, the element position data in a position data file are sorted in the descending order of the sizes of the characteristic line type IDs of the elements. When there is more than one element having a same characteristic line type ID, the element position data are sorted in the descending order of the characteristic line lengths.

Now, the operation of the edge line characteristic information management section 6 will be described below.

Figure 7:
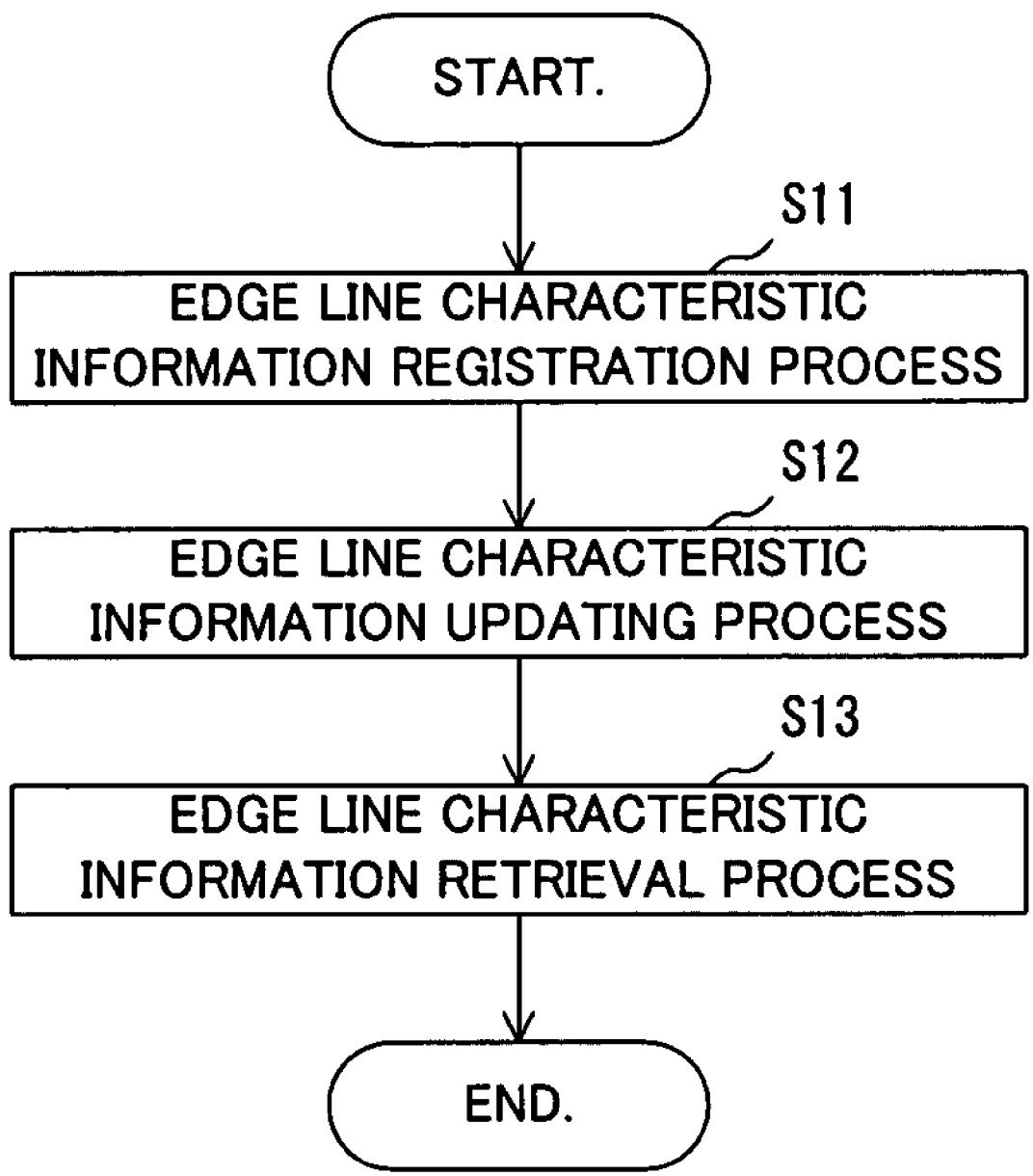
FIG. 7 is a flowchart of the operation of the edge line characteristic information management section of the embodiment of FIG. 1.

FIG. 7 is a flowchart of the operation of the edge line characteristic information management section of this embodiment. Referring to FIG. 7, firstly upon receiving a directive for building an edge line characteristic information DB 9 from the user by way of the input section 1, the edge line characteristic information management section 6 extracts the edge line of each model from the model DB 7 and generates edge line characteristic information from the edge lines and executes an edge line characteristic information registration process for storing it as a primary file (S11). A primary file have a data structure formed by using index files and position data files having a data structure same as that of the edge line characteristic information DB 9.

Then, the edge line characteristic information management section 6 executes an edge line characteristic information updating process to reflect the contents of the primary file to the edge line characteristic information DB 9 at a predetermined timing (S12).

Thereafter, as a retrieval key is input by the user by way of the input section 1, the edge line characteristic information management section 6 executes an edge line characteristic information retrieval process of retrieving one or more than one models that match the retrieval key from the edge line characteristic information DB 9 (S13).

Now, the edge line characteristic information registration process will be described below.

Figure 8:
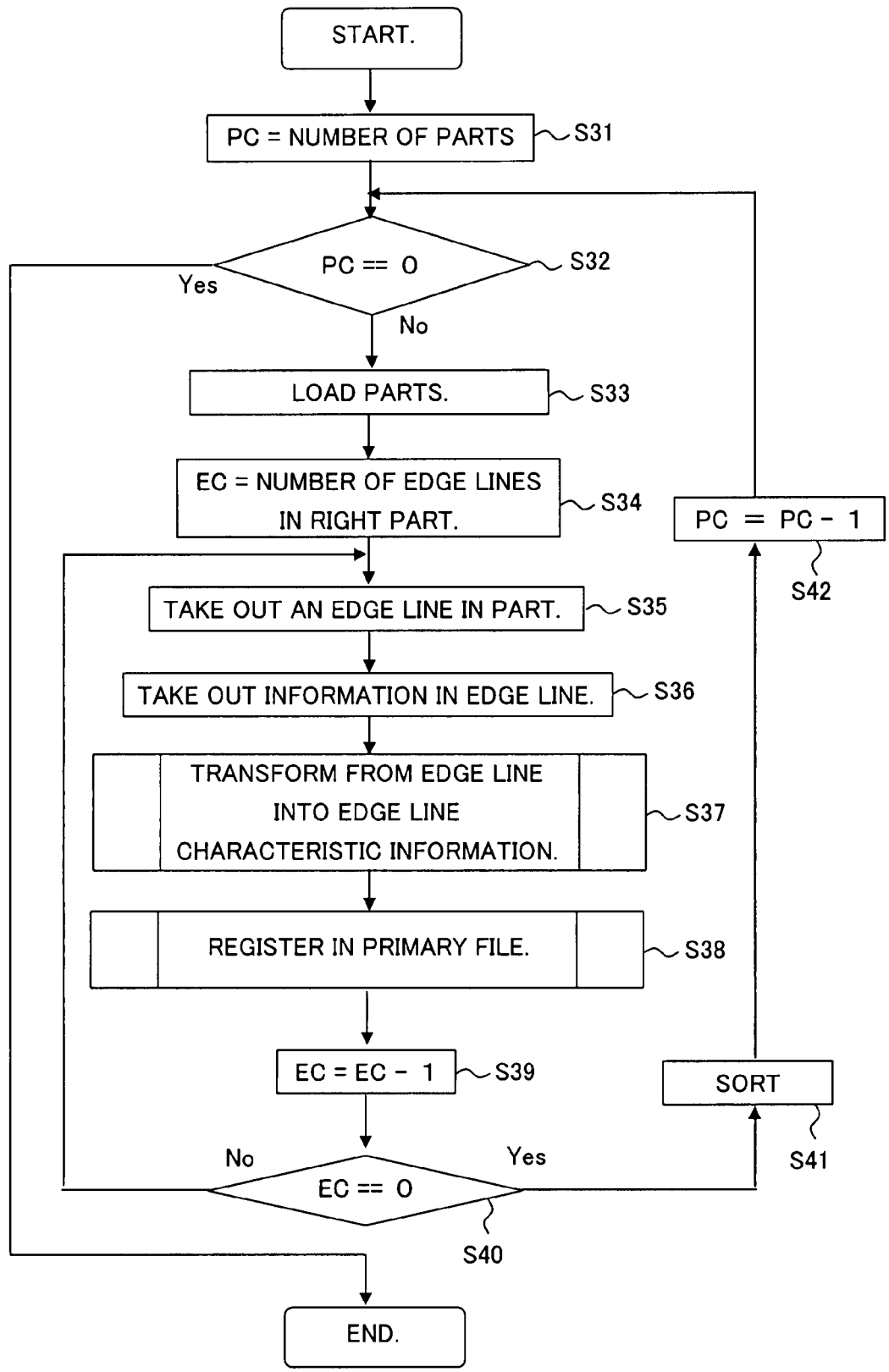
FIG. 8 is a flowchart of the operation of the edge line characteristic information registration process of the embodiment of FIG. 1.

FIG. 8 is a flowchart of the operation of the edge line characteristic information registration process of this embodiment. A design model that is designed by a CAD apparatus 2 and stored in the model DB 7 is constituted by models of several parts. Therefore, referring to FIG. 8, firstly the edge line characteristic information management section 6 counts the number of parts contained in the design model to be registered in the edge line characteristic information DB 9 and stores the counted number of parts in variable PC (S31). Thereafter, the edge line characteristic information management section 6 determines if the PC is equal to 0 or not (S32).

The flow of operation ends, if the PC is equal to 0 (S32, Yes) and hence there is no part for which edge line characteristic information is to be generated. If, on the other hand, the PC is 1 or greater than 1 (S32, No), the edge line characteristic information management section 6 selects one of the PC parts in the model DB 7 as right part. Then, it downloads the model of the right part from the model DB 7 and acquires the information (model name, arbitrary information and so on) to be stored in the edge line characteristic information DB 9 from the model (S33). Thereafter, the edge line characteristic information management section 6 acquires the number of edge lines in the right part and stores it in the variable EC (S34).

Subsequently, the edge line characteristic information management section 6 selects one of the EC edge lines in the right part as right edge line (S35). Then, the edge line characteristic information management section 6 acquires information on the right edge line (S36). Then, it transforms the edge line into edge line characteristic information (S37) and registers it in the primary file in the format of index file and position data file (S38). Thereafter, the edge line characteristic information management section 6 decrements the EC by 1 (S39) and determines if the EC is equal to 0 or not (S40). If the EC is not less than 1 (S40, No) and hence there is at least an edge line that has not been selected yet in the right part, the edge line characteristic information management section 6 moves to the processing step S35. If, on the other hand, the EC is equal to 0 (S40, Yes) and hence all the edge lines in the right part have been selected, the edge line characteristic information management section 6 sorts the elements in the right part in the primary file (S41) as described above by referring to the data structure of index file and decrements the PC by 1 (S42) to proceed to the processing step S32.

Now, the edge line characteristic information updating process will be described below. The edge line characteristic information management section 6 executes an edge line characteristic information updating process at the timing when the CPU (central processing unit) of the CAD apparatus 2 is in an idle state, when a predetermined time has passed since the immediately preceding edge line characteristic information updating process and no retrieval process is being executed or when the edge line characteristic information DB updating button is depressed by the user by way of the input section 1 and no retrieval process is being executed. The edge line characteristic information DB updating button is provided on the CAD display screen by the editing section 3. In the edge line characteristic information updating process, the edge line characteristic information management section 6 moves the index file and the position data file of the primary file to the edge line characteristic information DB 9 and sorts the index file DB as described above by referring to the data structure of the index file DB. Additionally, the edge line characteristic information management section 6 updates the position data file pointer in the index file at the timing of updating the position data file DB.

As described above, a primary file having a data structure similar to that of the edge line characteristic information DB 9 is generated as a result of the edge line characteristic information registration process and the edge line characteristic information updating process is reflected to the edge line characteristic information DB 9 when no edge line characteristic information retrieval process is being executed. Thus, the problem of the edge line characteristic information retrieval process that may arise when the edge line characteristic information DB 9 is updated while an edge line characteristic information retrieval process is being executed is effectively avoided.

Now, the edge line characteristic information retrieval process will be described below.

Figure 9:
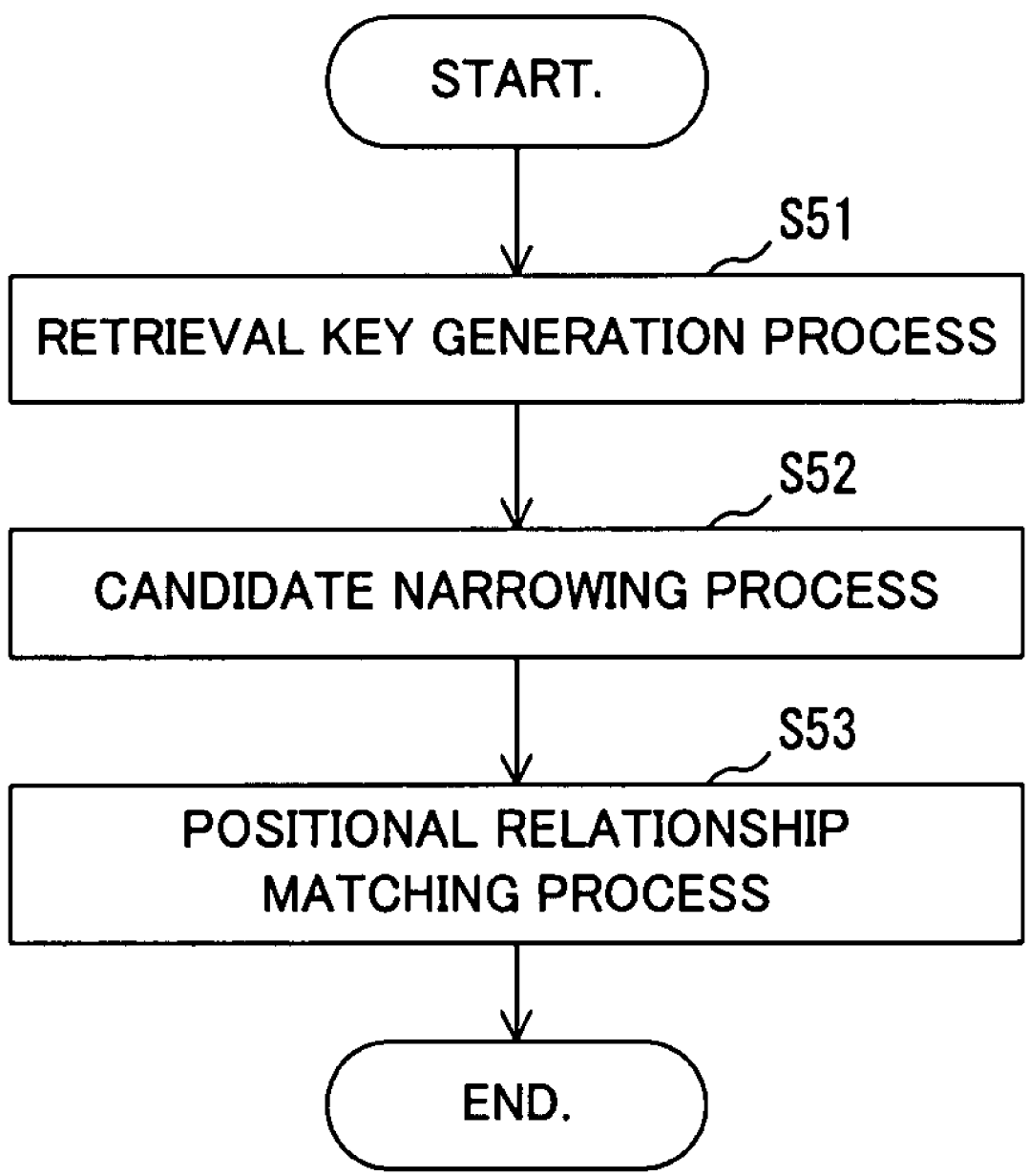
FIG. 9 is a flowchart of the operation of the edge line characteristic information retrieval process of the embodiment of FIG. 1.

FIG. 9 is a flowchart of the operation of the edge line characteristic information retrieval process of this embodiment. Referring to FIG. 9, firstly the edge line characteristic information management section 6 receives the requirements to be met for a retrieval process from the user by way of the input section 1 and executes a retrieval key generation process of generating a retrieval key (S51). Then, the edge line characteristic information management section 6 executes a candidate narrowing process of narrowing the models, using the index file DB, and preparing a candidate list that shows the results of the narrowing operation (S52). Thereafter, the edge line characteristic information management section 6 executes a positional relationship matching process of comparing the positional relationship of the elements in the retrieval key and that of the elements in the candidate list and determining the model that matches the retrieval key as the model that is selected as a result of retrieval (S53) before it ends the flow of operation.

Now, the retrieval key generation process will be described below.

Figure 10:
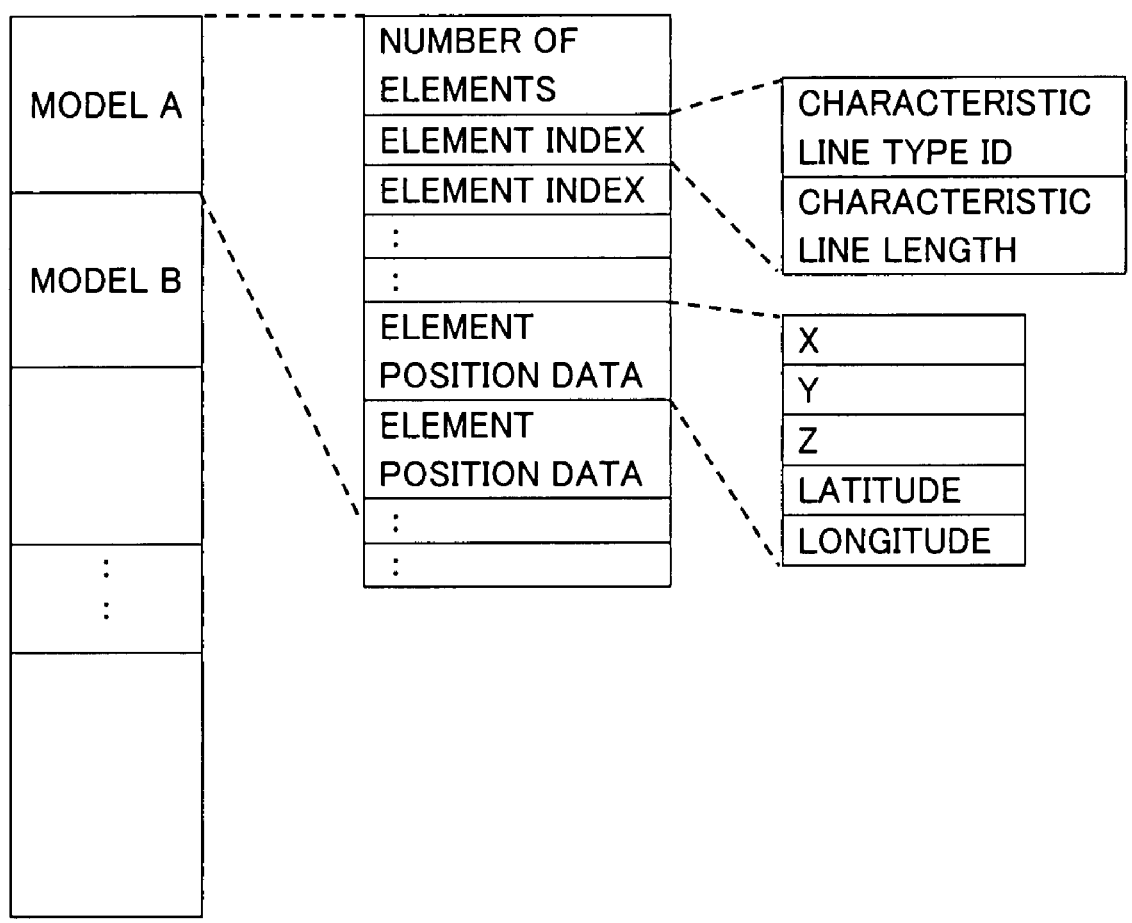
FIG. 10 is a schematic illustration of the data structure of the retrieval key of the embodiment of FIG. 1.

FIG. 10 is a schematic illustration of the data structure of the retrieval key of this embodiment. Referring to FIG. 10, a retrieval key is prepared for each model (part) and constituted using the number of elements, the element indexes of the respective elements and the element position data of the respective elements. Like the edge line characteristic information DB 9, the element index stores the characteristic line type ID and the characteristic line length out of the edge line characteristic information of the element, whereas the element position data stores the representative coordinates (X, Y, Z) and the elements of the representative vector (latitude, longitude). Additionally, like the element indexes of the index file DB, the element indexes in the retrieval key are sorted in the descending order of the sizes of the characteristic line type IDs. In the same characteristic line type ID, they are sorted in the descending order of the characteristic line lengths.

Figure 11:
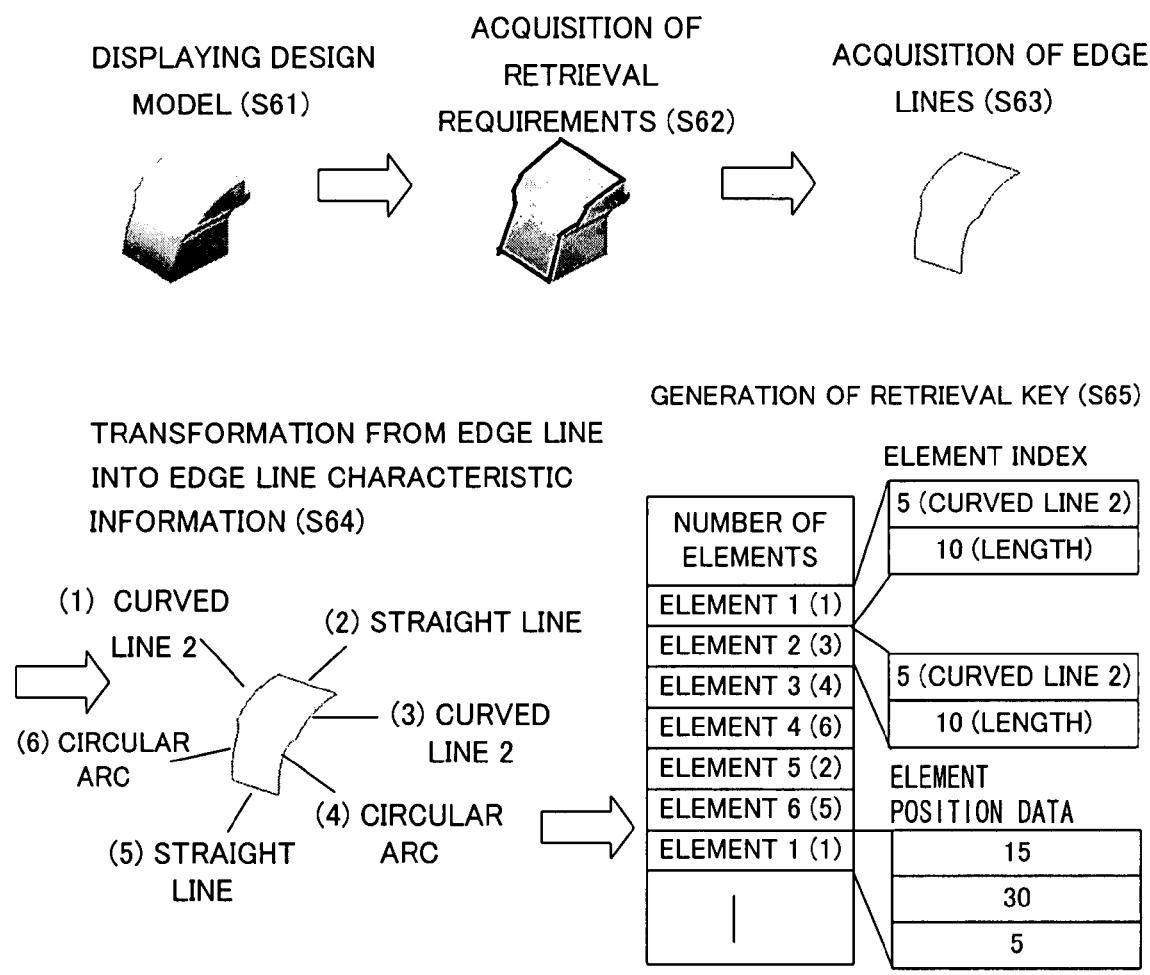
FIG. 11 is a flowchart of the operation of the retrieval key generation process of the embodiment of FIG. 1.

FIG. 11 is a flowchart of the operation of the retrieval key generation process of this embodiment. Referring to FIG. 11, the data management section 4 causes the display section 8 to display the design model that is the model being designed by the user (S61). The processing step S61 in FIG. 11 indicates the design model being displayed at the display section 8. Then, the edge line characteristic information management section 6 acquires the requirements to be met for the retrieval input by the user by way of the input section 1 (S62). The processing step S62 in FIG. 11 indicates a state where one of the parts of the design model being displayed at the display section 8 is selected. The requirements of retrieval are all or parts (edge lines, surfaces) of the design model selected by the user on the display screen by way of the input section 1. Thereafter, the edge line characteristic information management section 6 acquires the edge lines included in the requirements of retrieval of the design model (S63). In FIG. 11, the processing step S63 indicates the edge lines of the selected part. Then, the edge line characteristic information management section 6 transforms each of the acquired edge lines into edge line characteristic information as in the case of the edge line characteristic information registration process (S64). In FIG. 11, the processing step S64 indicates the number and the characteristic line type of each of the edge lines. Subsequently, the edge line characteristic information management section 6 generates a retrieval key from the edge line characteristic information obtained as a result of the transformation and sorts the pieces the edge line characteristic information (S65) to end the flow of operation. In FIG. 11, the processing step S65 indicates the data structure of the generated retrieval key.

Now, the candidate narrowing process will be described below.

Figure 12:
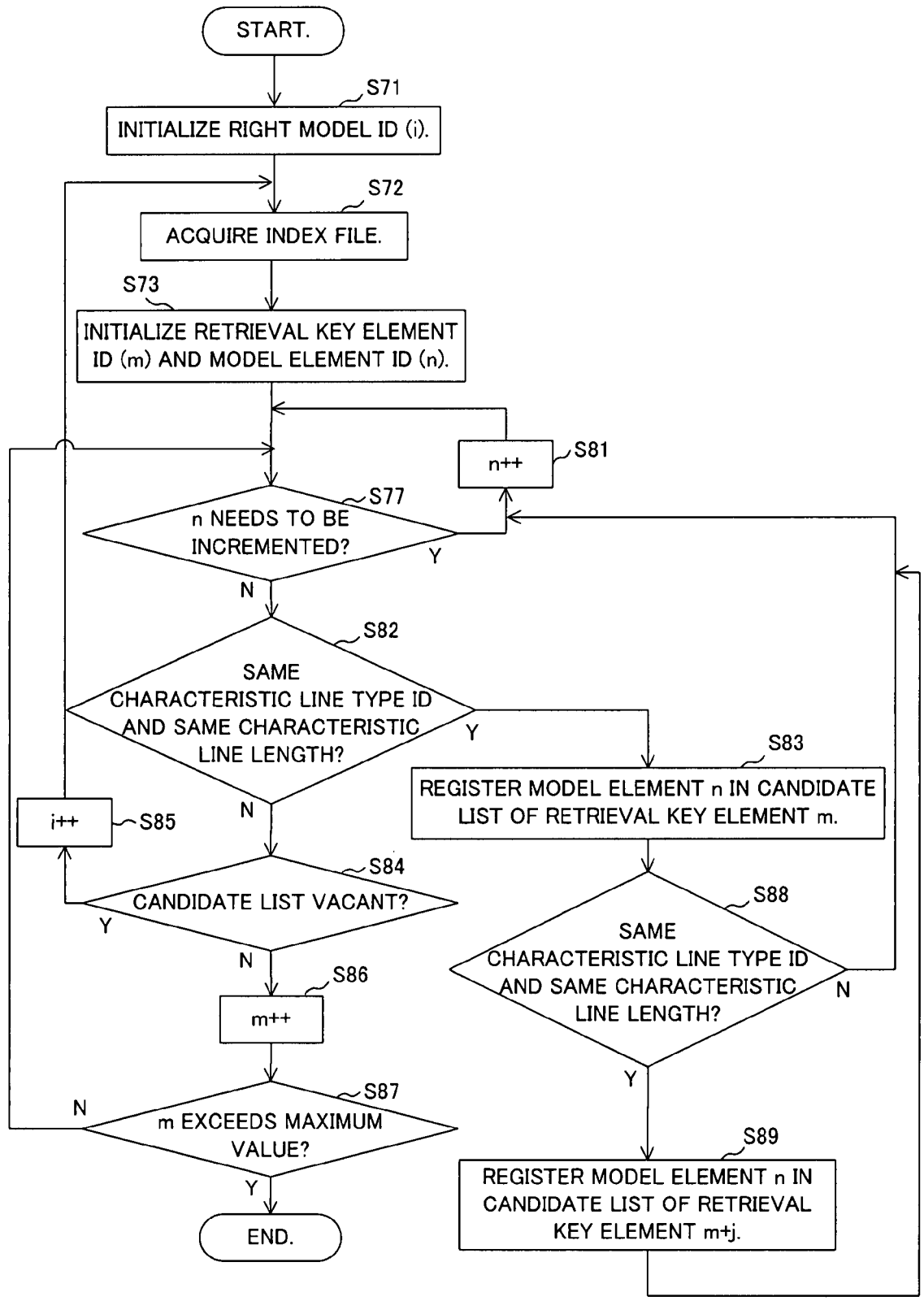
FIG. 12 is a flowchart of the candidate narrowing process of the embodiment of FIG. 1.

FIG. 12 is a flowchart of the candidate narrowing process of this embodiment.

Referring to FIG. 12, firstly the edge line characteristic information management section 6 initializes the ID (i) of the right model to be selected from the ID file DB to 1 (S71). Then, the edge line characteristic information management section 6 acquires the index file of the right model (S72). Subsequently, the edge line characteristic information management section 6 initializes the ID (m) of the retrieval key element, which is an element in the retrieval key, to 1 and also the ID (n) of the model element, which is an element in the right model, to 1 (S73).

Thereafter, the edge line characteristic information management section 6 compares the element index of the retrieval key element m and that of the model element n. Note that the characteristic line type ID and the characteristic line length of the retrieval key element m are expressed respectively by Qm and Pm, while the characteristic line type ID and the characteristic line length in the model element n are expressed respectively by Ln and Kn. Additionally, the edge line characteristic information management section 6 determines if the requirement of Ln>Qm (the characteristic line type ID of the model element n is greater than the characteristic line type ID of the retrieval key element m) or the requirement of Ln=Qm and Kn+$\epsilon$>Pm (the characteristic line type ID of the retrieval key element m and the characteristic line type ID of the model element n are equal to each other and the characteristic line length of the model key element n is greater than the characteristic line length of the retrieval key element m) is met or not (S77). Note that $\epsilon$ in the above formula is a predetermined error value in the characteristic line length.

If the requirement is met (S77, Y), the edge line characteristic information management section 6 increments n by 1 and selects the next model element n (S81) to move to the processing step S77. If, on the other hand, the requirement is not met (S77, N), the edge line characteristic information management section 6 determines if the requirement that Ln=Qm and Kn–$\epsilon$<=Pm<=Kn+$\epsilon$ (the characteristic line type ID of the retrieval key element m and the characteristic line type ID of the model element n are equal to each other and the characteristic line length of the retrieval key element m and the characteristic line length of the model element n are also equal to each other) is met or not (S82).

If the requirement is met (S82, Y), the edge line characteristic information management section 6 judges that the model element n is a candidate that matches the retrieval key element m and registers the model element n in the candidate list of the retrieval key element m (S83) to move to the processing step S88. If, on the other hand, the requirement is not met (S82, N), the edge line characteristic information management section 6 determines if the candidate list of the retrieval key element m is vacant or not (S84). If the candidate list is vacant (S84, Y), the edge line characteristic information management section 6 judges that the model element doe not match the right model and increments i by 1 to select the next right model (S85) and return to processing step S72. If, on the other hand, the candidate list is not vacant (S84, N), the edge line characteristic information management section 6 increments m by 1 (S86) and determines if m exceeds the maximum value (the number of elements of the retrieval key) or not (S87).

If m does not exceed the maximum value (S87, N), the edge line characteristic information management section 6 returns to the processing step S77. If, on the other hand, m exceeds the maximum value (S87, Y), the edge line characteristic information management section 6 ends the flow of operation.

In the processing step S88, the edge line characteristic information management section 6 determines for each of the model element m and all the subsequent model elements m+j if the requirement that Ln=Q(m+j) and Kn–$\epsilon$<=P(m+j)<=Kn+$\epsilon$ (the characteristic line type ID of the retrieval key element m+j and the characteristic line type ID of the model element n are equal to each other and the characteristic line length of the retrieval key element m+j and the characteristic line length of the model element n are also equal to each other) is met or not. If the requirement is met (S88, Y), the edge line characteristic information management section 6 judges that the model element n is a candidate that matches the retrieval key element m+j and registers the model element n in the candidate list of the retrieval key element m+j (S89) to move to the processing step S81. If, on the other hand, the requirement is not met (S88, N), the edge line characteristic information management section 6 moves to the processing step S81.

Now, the candidate list will be described below.

Figure 13:
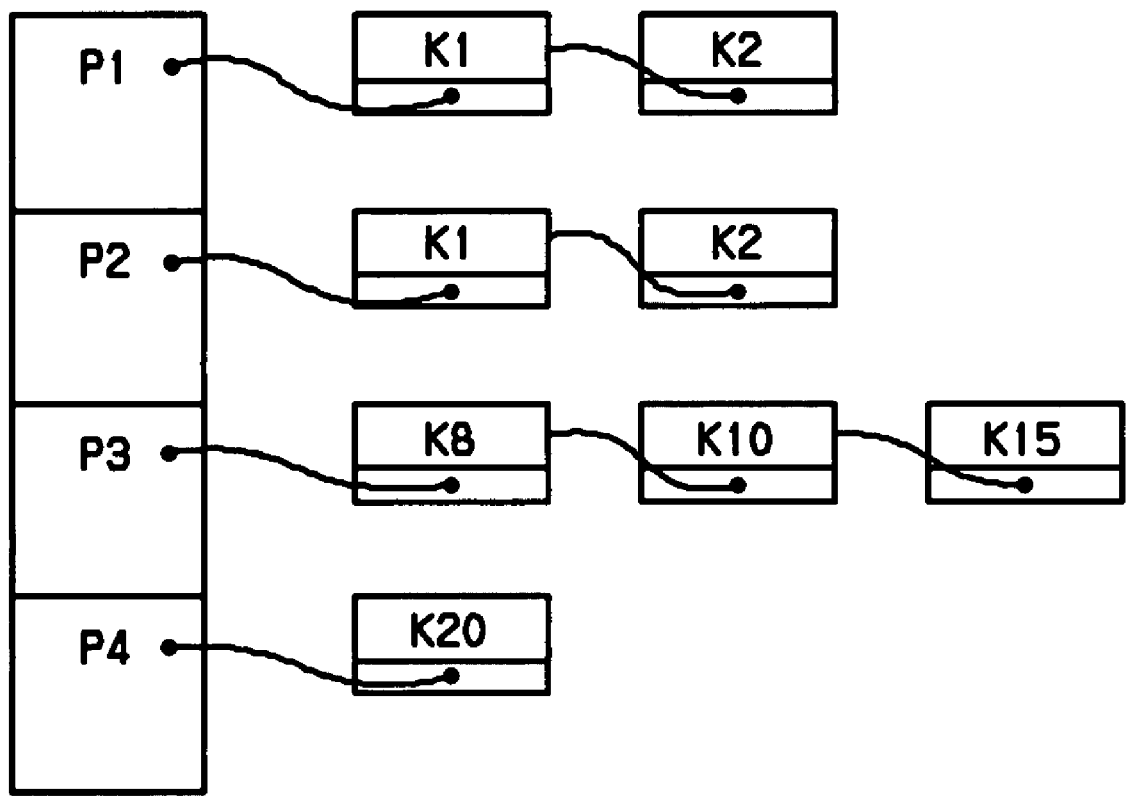
FIG. 13 is a schematic illustration of the data structure of the candidate list of the embodiment of FIG. 1.

FIG. 13 is a schematic illustration of the data structure of the candidate list of this embodiment. Referring to FIG. 13, the candidate list is prepared as a result of the candidate narrowing process as described above where the model elements K1, K2 are registered as candidates that match the retrieval key element P1 and the model elements K1, K2 are registered as candidates that match the retrieval key element P2, whereas the model elements K8, K10, K15 are registered as candidates that match the retrieval key element P3 and the model element K20 is registered as candidate that matches the retrieval key element P4.

Now, the positional relationship matching process will be described below.

Firstly, the object of the positional relationship matching process will be described. FIG. 14 is a schematic illustration of models of this embodiment. Referring to FIG. 14, all of the model A, the model B and the model C have curved line a and curved line b. Assume here that the model A is provided as retrieval key and the model B and the model C are stored in the model DB 7 and the edge line characteristic information DB 9. The curved line a and the curved line b are stored in the edge line characteristic information DB 9 as pieces of edge line characteristic information having same data. The model B and the model C are registered in the candidate list as a result of a candidate narrowing process. Then, the model B is output as a result of a positional relationship matching process where the model A is compared with the model B and model C for the positional relationship of the curved line a and the curved line b. In the positional relationship matching process, the edge line characteristic information management section 6 compares the positional relationship of the combinations of two retrieval key elements and the positional relationship of the combinations of two model elements. More specifically, the edge line characteristic information management section 6 compares all the combinations and selects the model for which all the positional relationships of the combinations of the retrieval key elements and those of the combinations of the model elements agree with each other as retrieved model.

Figure 15:
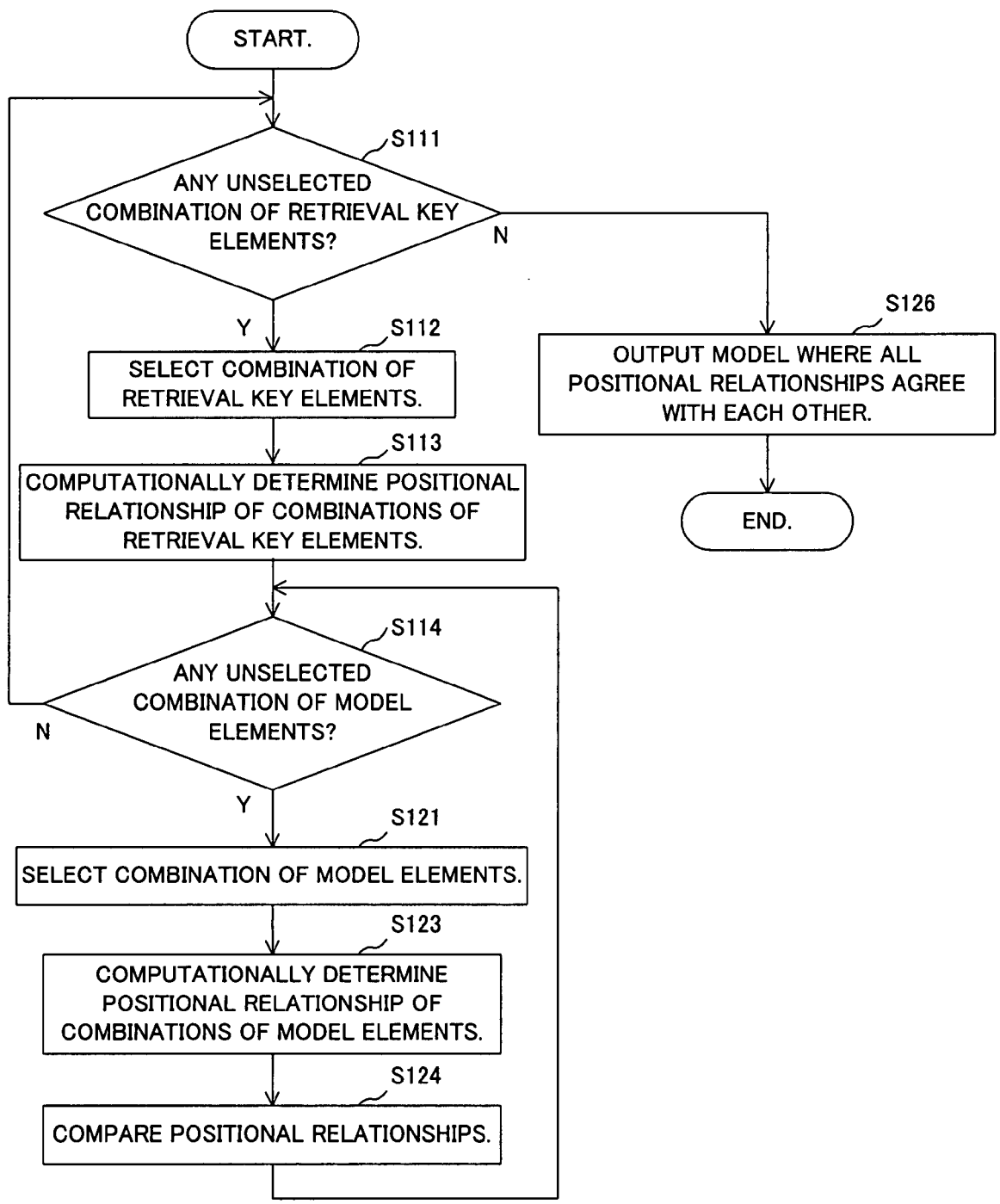
FIG. 15 is a flowchart of the operation of the positional relationship matching process of the embodiment of FIG. 1.

FIG. 15 is a flowchart of the operation of the positional relationship matching process of this embodiment. After the candidate narrowing process, the edge line characteristic information management section 6 firstly determines if a combination of two retrieval key elements has not been selected or not (S111). The edge line characteristic information management section 6 moves to the processing step S126 when there is not any unselected combination (S111, N), whereas it proceeds to the processing step S112 where there is at least an unselected combination (S111, Y). Then, the edge line characteristic information management section 6 selects an unselected combination of two retrieval key elements from the head of the retrieval key (S112). Then, the edge line characteristic information management section 6 acquires the element position data of the selected retrieval key elements from the retrieval key and computationally determines the positional relationship of the combination of the retrieval key elements (S113). Thereafter, the edge line characteristic information management section 6 determines if there is still any unselected combination of model elements registered in the respective candidate lists of the selected retrieval key elements (S114). The edge line characteristic information management section 6 returns to the processing step S111 when there is not any unselected one (S114, N), whereas it moves to the processing step S121 when there is still at least an unselected one (S114, Y).

Subsequently, the edge line characteristic information management section 6 selects a combination of model elements registered in the respective candidate lists of the retrieval key elements that corresponds to the acquired combination (S121). Then, the edge line characteristic information management section 6 acquires the element position data of the selected model elements from the position data file DB as in the case of retrieval key elements and computationally determines the positional relationship of the combination of the model elements (S123). Thereafter, the edge line characteristic information management section 6 compares the positional relationship of the combination of the retrieval key elements and that of the combination of the model elements (S124) and returns to the processing step S114.

In the processing step S126, the edge line characteristic information management section 6 outputs the models for which the positional relationships of the combinations of the retrieval key elements and those of the combinations of the model elements agree with each other and ends the flow of operation. Thus, the edge line characteristic information management section 6 can access the corresponding model in the model DB 7 by using the model name (full pathname) contained in the index file of the model obtained as a result of retrieval.

Figure 16:
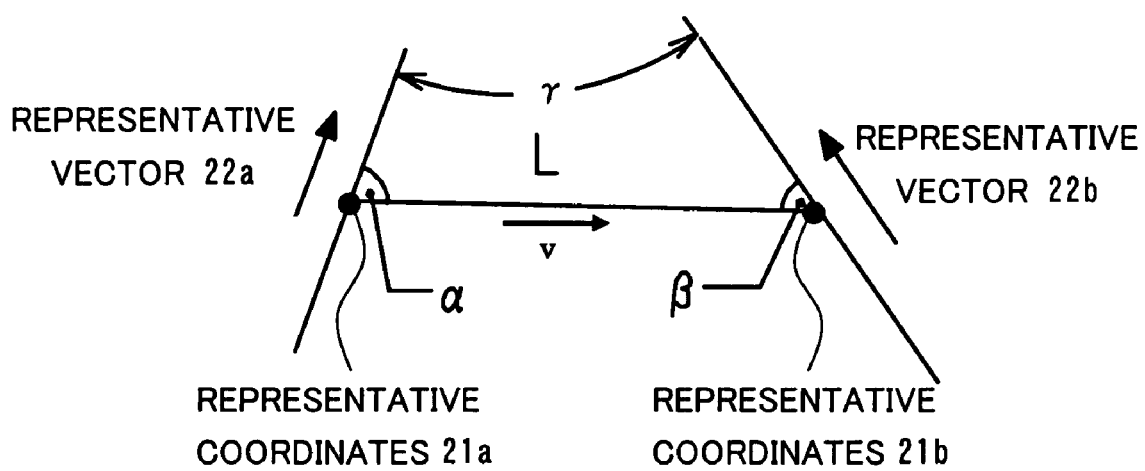
FIG. 16 is a schematic illustration of the positional relationship of a combination of elements of the embodiment of FIG. 1, shown as an example.

Now, the operation of computationally determining the positional relationship of the combination of the model elements in the processing steps S121 and S1 23 will be described below. FIG. 16 is a schematic illustration of the positional relationship of a combination of elements of this embodiment, shown as an example. Referring to FIG. 16, assume that one of the elements of the combination has representative coordinates 21a and a representative vector 22a as element position data, whereas the other element has respective coordinates 21b and a representative vector 22b as element position data. In the processing steps S121 and S123, the edge line characteristic information management section 6 computationally determines the distance L between the representative coordinates 21a and the representative coordinates 21b, the angle $\alpha$ formed by the unit vector v that is the vector linking the representative coordinates 21a and the representative coordinates 21b, the angle $\beta$ formed by the vector v and the representative vector 22b and the angle $\gamma$ formed by the representative vectors 22a and 22b for the positional relationship. Note that the vector v and the representative vectors are unit vectors and the edge line characteristic information management section 6 computationally determines $\alpha$, $\beta$ and $\gamma$ from the exterior products of the combinations of two unit vectors.

In the processing step S124, when the L, $\alpha$, $\beta$ and $\gamma$ obtained from the combinations of the retrieval key elements and the L, $\alpha$, $\beta$ and $\gamma$ obtained from the combinations of the model elements agree with each other, the edge line characteristic information management section 6 judges that the positional relationships agree with each other. The supplementary angle of 180 degrees is also taken into consideration for the judgment of agreement or disagreement of the two sets of $\alpha$, $\beta$ and $\gamma$.

Figures 17, 18:
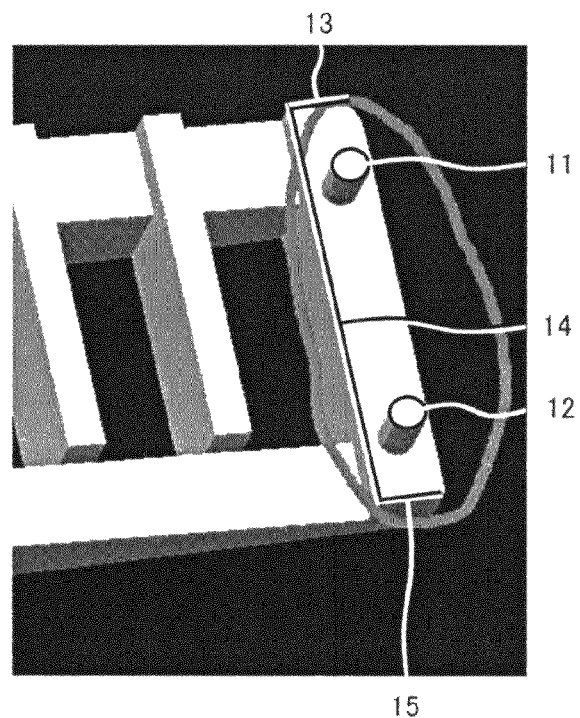
FIG. 17 is a schematic illustration of the design models registered in the model DB and the edge line characteristic information DB of the embodiment of FIG. 1, shown as an example.
FIG. 18 is a schematic illustration of a model of data A of the embodiment of FIG. 1, shown as an example.

An example where an edge line characteristic information retrieval process is executed when the hardware of the CAD apparatus 2 is Pentium III (tradename) 1.2 GHz and the memory capacity is 512 MB while the model DB 7 stores design models of 1 GB binary data will be described below. FIG. 17 is a schematic illustration of the design models registered in the model DB and the edge line characteristic information DB of this embodiment, shown only as an example. The table of FIG. 17 shows the classification of design models, the number of parts (models) contained in a single design model, the number of elements (edge lines) of each of the characteristic line types (straight line, circular arc, circle, curved line (curved line 1 and curved line 2)) included in one design model and the sum of the numbers of elements and the number of design models. The design models are classified into data A, data B, data C, data D and data E. The data A is the data of a single design model and the data B is the data of nine design models obtained by modifying the dimensions of the parts in the data A. The data C, the data D and the data E are the data of design models that are totally different from the data A. Thus, a total of 999 design models and a total of 22,024,060 edge lines are stored in the model DB 7 and the edge line characteristic information DB 9.

FIG. 18 is a schematic illustration of a design model of this embodiment, shown as an example. The illustrated design model indicates the above-described data A. In the edge line characteristic information retrieval process, the data A of this drawing is displayed at the display section 8 as a result of the processing step S61 and, when the user selects part or all of the data A by way of the input section 1, the retrieval requirements are obtained as a result of the processing step S62. In the data A of the drawing, five edge lines are selected by the user as retrieval requirements. The five edge lines include the edge lines 11, 12 of the circles at the tops of the two cylindrical projections and the edge lines 13, 14, 15 of the sides of the rectangles surrounding the respective projections. The edge line characteristic information management section 6 generates a retrieval key having the five edge lines (elements) according to the retrieval requirements and executes a retrieval process. As a result of the retrieval process, the retrieval time is 3.5 seconds and it was possible to identify only the model of the data A. The retrieval time is remarkably reduced from the retrieval time required by any known similar shape retrieval feature.

Similar shapes are retrieved for given retrieval requirements with known shape retrieval features. However, with this embodiment, it is possible to retrieve a model that meets the retrieval requirements in terms of shape and dimensions. Additionally, if compared with known similar shape retrieval features that involve transformation into an image, it is possible to retrieve a model at high speed as a result of using edge line characteristic information having only a reduced quantity of information.

According to the present invention, the DB to be used for retrieval operation (edge line characteristic information DB 9) is divided into two DBs (an index file DB and a position data file DB) and one of the DBs is used for narrowing candidates (candidate narrowing process) and subsequently the other DB is used for a retrieval process (positional relationship matching process) to reduce the number of seeks, the volume of data to be read in and the file access time in the retrieval process like many retrieval features.

The characteristic line type ID that is least frequently used for designs is checked first in the retrieval key and the edge line characteristic information DB 9 so that it is possible to determine if the characteristic line type is contained in the right model or not in the initial stages of operation and reduce the retrieval time. When there is a plurality of elements having the same characteristic line type ID in the retrieval key and the edge line characteristic information DB 9, they are sorted and arranged in the descending order of the characteristic line lengths. Thus, if there are N same characteristic line type IDs in the right model, it is possible to determine that the right model does not match the retrieval key at the time when the characteristic line length of the retrieval key element is found to be greater than the characteristic line length of the model element without performing N comparisons. Thus, it is possible to reduce a retrieval time.

The first characteristic information corresponds to the index file and the position data file in the above-described embodiment. The second characteristic information corresponds to the retrieval key in the embodiment. The third shape data corresponds to the results of the retrieval by means of the edge line characteristic information retrieval process of the embodiment. The first edge line acquisition step corresponds to the processing step S35 in the embodiment. The information registration step corresponds to the processing steps S36, S37 and S38 in the embodiment. The second edge line acquisition step corresponds to the processing step S63 in the embodiment. The information generation step corresponds to the processing steps S64 and S65 in the embodiment. The retrieval step corresponds to the processing steps S52, S53 in the embodiment. The first edge line acquisition section and the second edge line acquisition section correspond to the data management section in the embodiment. The information registration section, the information generation section and the retrieval section in claims correspond to the edge line characteristic information management section in the embodiment.

Thus, a database management apparatus according to the present invention can be applied to an information processing apparatus without difficulty to enhance the performance of the latter. For the purpose of the present invention, an information processing apparatus may be a PC (personal computer), a server or a work station.

According to the present invention, it is possible to provide a program for causing the computer of a database management apparatus to execute the above-described processing steps. Such a program can be executed by the computer of a database management apparatus when the program is stored in a computer readable recording medium. Computer readable recording mediums that can be used for the purpose of the present invention include internal storage apparatus such as ROMs and RAMs mounted in computers, portable type storage mediums such as CD-ROMs, flexible disks, DVD disks, magneto-optical disks and IC cards, databases storing computer programs, external computers, databases of such computers and transmission mediums on communication lines.

What is claimed is:

1. A non-transitory computer readable medium storing a database management program for causing a computer to manage a database for shape data, the program comprising:
 a first edge line acquisition step that acquires an edge line from at least single first shape data that is shape data of a shape designed in advance and includes the edge line;
 an information registration step that generates edge line characteristic information that is information showing the characteristics of the edge line according to the edge line acquired in the first edge line acquisition step, defines the edge line characteristic information as first edge line characteristic information, associates the first edge line characteristic information with the first shape data and registers it in the database;
 a second edge line acquisition step that acquires an edge line from second shape data that is shape data representing a retrieval requirement and includes the edge line;
 an information generation step that generates edge line characteristic information according to the edge line acquired in the second edge line acquisition step and defines the edge line characteristic information as second edge line characteristic information; and
 a retrieval step that retrieves third shape data that agrees with the second shape data out of the first shape data according to the first edge line characteristic information registered in the information registration step and the second edge line characteristic information generated in the information generation step.

2. The non-transitory computer readable medium according to claim 1, wherein
 the edge line characteristic information include edge line shape information showing the shape of the edge line and edge line position information showing the positional relationship between the edge line and the other edge line or edge lines included in the shape data.

3. The non-transitory computer readable medium according to claim 2, wherein
 the edge line shape information includes type information showing the type of the edge line and size information showing the size of the edge line.

4. The non-transitory computer readable medium according to claim 3, wherein
 the edge line position information includes the representative coordinates that are the coordinates showing the position of the edge line in the shape data to which the edge line belongs and the representative vector that is the vector showing the direction of the edge line in the shape data to which the edge line belongs.

5. The non-transitory computer readable medium according to claim 2, wherein
 the retrieval step defines the first shape data whose edge line shape information agrees with the edge line shape information of the second shape data as candidate shape data out of the first shape data, if there are more than one first shape data according to the edge line shape information of the first shape data and the edge line shape information of the second shape data, and selects candidate shape data showing a positional relationship of the edge lines thereof agreeing with the positional relationship of the edge lines of the second shape data as third shape data out of the candidate shape data, if there are more than one candidate shape data, according to the edge line position information of the candidate shape data and the edge line position information of the second shape data.

6. The non-transitory computer readable medium according to claim 5, wherein
the retrieval step selects combinations of the edge lines of the second shape data, computationally determines the positional relationship of the combinations from the edge line position information corresponding to the combinations, selects combinations of the edge lines of the candidate shape data, computationally determines the positional relationship of the combinations from the edge line position information corresponding to the combinations and defines the candidate shape data as third shape data when the positional relationship of all the combinations obtained from the second shape data and the positional relationship of all the combinations obtained from the candidate shape data agree with each other.

7. The non-transitory computer readable medium according to claim 4, wherein
the size information is the length of the edge line, the radius of the edge line or the distance of the straight line from the starting point to the terminal point of the edge line and the representative coordinates show the bisectional point of the edge line, the center of the edge line or the bisectional point of the straight line from the starting point to the terminal point of the edge line, while the representative vector shows the direction from the starting point to the terminal point of the edge line, the direction of the central axis of the edge line or the direction of the tangential line at the representative coordinates.

8. The non-transitory computer readable according to claim 7, wherein
the type information shows either a first curved line that is a straight line, a circle, a circular arc or an open curved line other than a circular arc or a second curved line that is a closed curved line other than a circle.

9. The non-transitory computer readable according to claim 8, wherein
the size information is the length of the edge line and the representative coordinates show the bisectional point of the edge line, while the representative vector shows the direction from the starting point to the terminal point of the edge line when the type information of the edge line indicates a straight line.

10. The non-transitory computer readable according to claim 8, wherein
the size information is the radius of the edge line and the representative coordinates show the center of the edge line, while the representative vector shows the direction of the central axis of the edge line when the type information of the edge line indicates a circle.

11. The non-transitory computer readable according to claim 8, wherein
the size information is the length of the edge line and the representative coordinates show the bisectional point of the edge line, while the representative vector shows the tangential line at the representative coordinates when the type information of the edge line indicates a circular arc.

12. The non-transitory computer readable according to claim 8, wherein
the size information is the distance of the straight line from the starting point to the terminal point of the edge line and the representative coordinates show the bisectional point of the edge line between the starting point and the terminal point thereof, while the representative vector shows the direction from the starting point to the terminal point of the edge line when the type information of the edge line indicates a first curved line.

13. The non-transitory computer readable according to claim 8, wherein
the size information is the length of the edge line and the representative coordinates show the starting point of the edge line, while the representative vector shows the direction of the tangential line of the edge line when the type information of the edge line indicates a second curved line.

14. The non-transitory computer readable according to claim 3, wherein
the information registration step sorts the edge line shape information from the type with the lowest frequency of utilization according to the type information.

15. The non-transitory computer readable according to claim 14, wherein
the information registration step sorts the edge line shape information according to the size information.

16. A database management apparatus for managing a database for shape data, the apparatus comprising:
a first edge line acquisition section that acquires an edge line from at least single first shape data that is shape data of a shape designed in advance and includes the edge line;
an information registration section that generates edge line characteristic information that is information showing the characteristics of the edge line according to the edge line acquired by the first edge line acquisition section, defines the edge line characteristic information as first edge line characteristic information, associates the first edge line characteristic information with the first shape data and registers it in the database;
a second edge line acquisition section that acquires an edge line from second shape data that is shape data representing a retrieval requirement and includes the edge line;
an information generation section that generates edge line characteristic information according to the edge line acquired by the second edge line acquisition section and defines the edge line characteristic information as second edge line characteristic information; and
a retrieval section that retrieves third shape data that agrees with the second shape data out of the first shape data according to the first edge line characteristic information registered by the information registration section and the second edge line characteristic information generated by the information generation section.

17. The apparatus according to claim 16, wherein
the edge line characteristic information include edge line shape information showing the shape of the edge line and edge line position information showing the positional relationship between the edge line and the other edge line or edge lines included in the shape data.

18. The apparatus according to claim 17, wherein
the retrieval section defines the first shape data whose edge line shape information agrees with the edge line shape information of the second shape data as candidate shape data out of the first shape data, if there are more than one first shape data according to the edge line shape information of the first shape data and the edge line shape information of the second shape data, and selects candidate shape data showing a positional relationship of the edge lines thereof agreeing with the positional relationship of the edge lines of the second shape data as third shape data out of the candidate shape data, if there are more than one candidate shape data, according to the edge line position information of the candidate shape data and the edge line position information of the second shape data.

19. The apparatus according to claim 18, wherein
the retrieval section selects combinations of the edge lines of the second shape data, computationally determines the positional relationship of the combinations from the edge line position information corresponding to the combinations, selects combinations of the edge lines of the candidate shape data, computationally determines the positional relationship of the combinations from the edge line position information corresponding to the combinations and defines the candidate shape data as third shape data when the positional relationship of all the combinations obtained from the second shape data and the positional relationship of all the combinations obtained from the candidate shape data agree with each other.

20. A database management method for managing a database for shape data, the method comprising:
a first edge line acquisition step that acquires an edge line from at least single first shape data that is shape data of a shape designed in advance and includes the edge line;
an information registration step that generates edge line characteristic information that is information showing the characteristics of the edge line according to the edge line acquired in the first edge line acquisition step, defines the edge line characteristic information as first edge line characteristic information, associates the first edge line characteristic information with the first shape data and registers it in the database;
a second edge line acquisition step that acquires an edge line from second shape data that is shape data representing a retrieval requirement and includes the edge line;
an information generation step that generates edge line characteristic information according to the edge line acquired in the second edge line acquisition step and defines the edge line characteristic information as second edge line characteristic information; and
a retrieval step that retrieves third shape data that agrees with the second shape data out of the first shape data according to the first edge line characteristic information registered in the information registration step and the second edge line characteristic information generated in the information generation step.

* * * * *

UNITED STATES PATENT AND TRADEMARK OFFICE
CERTIFICATE OF CORRECTION

PATENT NO. : 7,957,595 B2
APPLICATION NO. : 11/892650
DATED : June 7, 2011
INVENTOR(S) : Mayayoshi Yamaguchi et al.

It is certified that error appears in the above-identified patent and that said Letters Patent is hereby corrected as shown below:

Column 19, Line 42, In Claim 8, after "readable" insert --medium--.

Column 19, Line 48, In Claim 9, after "readable" insert --medium--.

Column 19, Line 56, In Claim 10, after "readable" insert --medium--.

Column 19, Line 63, In Claim 11, after "readable" insert --medium--.

Column 20, Line 3, In Claim 12, after "readable" insert --medium--.

Column 20, Line 13, In Claim 13, after "readable" insert --medium--.

Column 20, Line 21, In Claim 14, after "readable" insert --medium--.

Column 20, Line 26, In Claim 15, after "readable" insert --medium--.

Signed and Sealed this
Tenth Day of January, 2012

David J. Kappos
*Director of the United States Patent and Trademark Office*